US008484745B2

(12) United States Patent
Bank et al.

(10) Patent No.: US 8,484,745 B2
(45) Date of Patent: Jul. 9, 2013

(54) ELECTRONIC CALENDAR COLLABORATION

(75) Inventors: Judith H Bank, Morrisville, NC (US); Lisa M Bradley, Cary, NC (US); Lin Sun, Morrisville, NC (US); Chunhui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1334 days.

(21) Appl. No.: 11/751,550

(22) Filed: May 21, 2007

(65) Prior Publication Data
US 2008/0294999 A1 Nov. 27, 2008

(51) Int. Cl.
*H04L 29/06* (2006.01)

(52) U.S. Cl.
USPC ....... 726/28; 726/8; 726/10; 726/27; 715/751

(58) Field of Classification Search
USPC .............................. 726/8, 10, 27, 28; 715/751
See application file for complete search history.

(56) References Cited

U.S. PATENT DOCUMENTS

| 2001/0014866 A1* | 8/2001 | Conmy et al. | 705/9 |
| 2003/0154116 A1 | 8/2003 | Lofton | |
| 2004/0215497 A1* | 10/2004 | Leist | 705/8 |
| 2008/0033957 A1* | 2/2008 | Forstall et al. | 707/9 |
| 2008/0270211 A1* | 10/2008 | Vander Veen et al. | 705/8 |
| 2009/0019367 A1* | 1/2009 | Cavagnari et al. | 715/716 |

OTHER PUBLICATIONS

Sharing Permissions, Trumba Product Support Forum, Jul. 2006, pp. 1-2, Trumba Corporation, <http://forums.trumba.com/lofiversion/index.php/t720.html>.

* cited by examiner

*Primary Examiner* — Justin T Darrow
(74) *Attorney, Agent, or Firm* — Marcia L. Doubet

(57) ABSTRACT

Meeting originators grant permission to update (i.e., add, change, and/or delete) a field or fields of a meeting invitation that corresponds to a calendar entry on an electronic calendar, enabling a meeting invitee to update a meeting invitation and to thereby communicate updates that can be reflected in the corresponding electronic calendar entries of other people who are invited to the meeting. Update permission may be granted to one meeting invitee, to all meeting invitees, or to a selected subset of the meeting invitees. Update permissions are associated with the particular meeting invitation, and preferably expire once the meeting time and date have passed. For recurring meetings, a particular update permission may be granted for a single instance of the meeting, or to all instances, and this permission preferably expires after the last instance of the recurring meeting has ended.

19 Claims, 12 Drawing Sheets

110
Save and Send Invitations | Save as Draft | Find Room or Resource | Delivery Options Calendar Entry
Meeting ▼ — 120

Subject

When — 130
Starts  Thur 03/29/2007  16  09:30 AM
Ends   Thur 03/29/2007  16  10:30 AM   1 hour
☐ Specify a different time zone
☐ Repeats — 131

Invitees — 140
Required (to)
Optional (cc)
FYI (bcc)

Scheduler — 150  Click to see Invitee, Room and Resource availability

Description — 160  Click to append attachment(s)
<Enter the description of this event>

☑ Notify Me   ☐ Default call-in
☐ Mark Private   ☐ Pencil In

170
Chair   CalendarOwner/Raleigh/IBM
Where   Location
        Rooms
        Resources
        Online   ☐ This is an Online Meeting Categorize  ▼

Save and Send Invitations

Subject: 510

To: 520   550

Date: 530

Start Time:

End Time:

Location:

Description:

Meeting

521

Beth ▼ , Carla

| All fields | 551 |
| Subject | 552 |
| To | 553 |
| Date | 554 |
| Time | 555 |
| Location | 556 |
| Description | 557 |

Building: XXX   Floor: XX   Room: XXX

Meeting to discuss X

Edit Document  710  720

*721* * Subject: | Meeting |

To: | Beth, Carla |

Date: | MM/DD/YYYY |

Start Time: | HH:MM  PM |

End Time: | HH:MM  PM |

Location: | Building: XXX   Floor: XX   Room: XXX |

*722* * Description: | Meeting to discuss X |
                                    723

*725* * Denotes the fields you have permission to edit in this invitation.

- [Save and Send Invitations] 810

\* Subject: | Meeting |

To: 820 | Beth  Carla |

Date: | MM/DD/YYYY |

Start Time: | HH:MM  PM |

End Time: | HH:MM  PM |

Location: | Building: XXX   Floor: XX   Room: XXX |

\* Description: | Meeting to discuss X and discuss Y |
821
822

\* Denotes the fields you have permission to edit in this invitation.

| | |
|---|---|
| Update Calendar 910 920 | |
| Subject: | Meeting |
| To: | 921 Allen, Carla |
| Date: | MM/DD/YYYY |
| Start Time: | HH:MM   PM |
| End Time: | HH:MM   PM |
| Location: | Building: XXX    Floor: XX    Room: XXX |
| Description: 930 | Meeting to discuss X and discuss Y 931 |

ELECTRONIC CALENDAR COLLABORATION

BACKGROUND OF THE INVENTION

The present invention relates to computer programming, and deals more particularly with electronic calendar applications.

Electronic calendar applications are used extensively in many people's daily work. Electronic calendars often contain a wealth of information about their owner. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth. Examples of electronic calendar systems include Microsoft Outlook® and Lotus Notes®, which also allows a user to create entries on his calendar for other people. For example, a secretary might have calendar entries for his own schedule, but also keep information about his manager's appointments on his manager's calendar (and optionally his own calendar as well). Such systems are quite popular among users. ("Outlook" is a registered trademark of Microsoft Corporation in the United States, other countries, or both, and "Lotus Notes" is a registered trademark of Lotus Development Corporation in the United States, other countries, or both.)

BRIEF SUMMARY OF THE INVENTION

The present invention defines techniques for electronic calendar collaboration. In one embodiment, this comprises: generating a meeting invitation, responsive to a meeting originator scheduling a meeting, wherein the meeting invitation comprises at least one field and invites at least one meeting invitee to attend the meeting, the meeting invitation configured to cause an electronic calendar application to create a calendar entry on an electronic calendar upon acceptance of the meeting invitation; and generating at least one update permission corresponding to the meeting invitation, responsive to granting thereof by the meeting originator, each generated update permission specifying that a selected meeting invitee is permitted to update at least one field of the meeting invitation, wherein each generated update permission enables the selected meeting invitee to update at least one of the at least one fields of the meeting invitation for which that meeting invitee is granted update permission.

This embodiment may further comprise: using, by a selected one of the at least one meeting invitee that is granted update permission, the granted update permission to update at least one of the at least one fields for which update permission is granted, the update configured to generate an updated meeting invitation for the meeting and the updated meeting invitation configured to cause the electronic calendar application to update the created calendar entry upon acceptance of the updated meeting invitation.

Embodiments of these and other aspects of the present invention may also, or alternatively, be provided as systems or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 1 provides a sample graphical user interface ("GUI") that may be used for providing information to schedule a meeting using an electronic calendar application;

FIGS. 5 and 7-9 show sample GUIs that are used to illustrate operation of embodiments of the present invention;

DETAILED DESCRIPTION OF THE INVENTION

Figure 2:
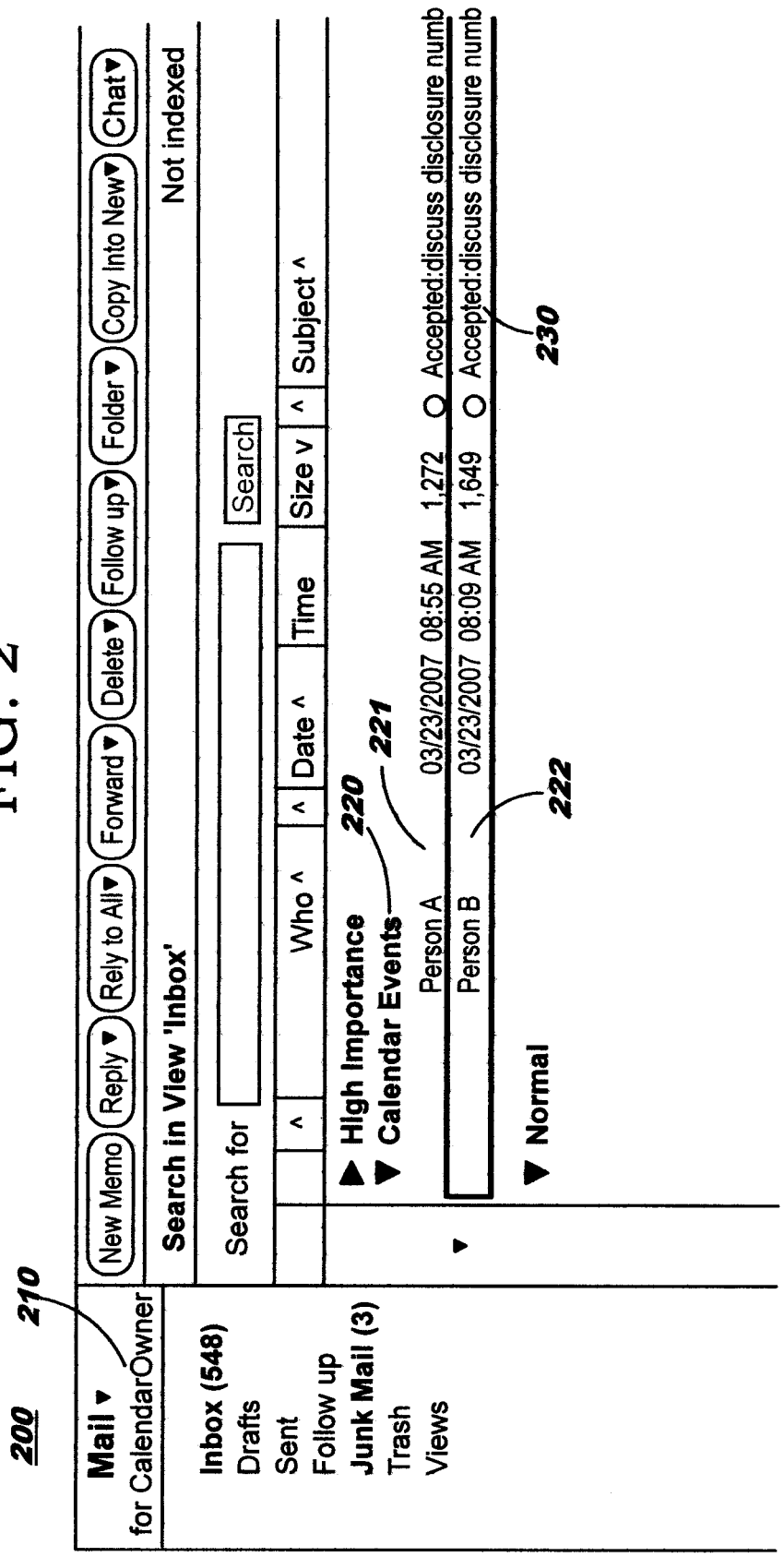
FIG. 2 depicts a GUI showing meeting acceptance notifications that have been received by a calendar owner as a meeting originator.

Embodiments of the present invention are directed toward scheduling meetings using electronic calendar applications (which may also be referred to as "calendar applications", "calendaring applications", or "calendar scheduling systems"). Persons who are invited to attend a meeting scheduled using an electronic calendar application as disclosed herein may selectively update meeting invitation information, thereby enabling the meeting invitees for the scheduled meeting to provide a type of collaboration among their electronic calendars, as will be described in more detail herein.

A person who is referred to herein as a "meeting originator" uses an electronic calendar application to schedule a meeting with other people, and these other people are referred to herein as "meeting attendees" or "invitees". See FIG. 1, which provides an example GUI 100 that may be used for providing information to schedule a meeting using an electronic calendar application. A subject 120 for the meeting is typically specified, as well as the meeting date and time 130. A more detailed meeting description may also be specified, if desired (see 160). The meeting originator creates (or retrieves) an invitation list (see 140), and a calendar application may then use this list to check each invitee's electronic calendar for available time periods (as indicated generally at 150). A meeting may then be scheduled during a time period in which all (or some majority) of the invitees have sufficient time available on their calendar. When the meeting originator (referred to in this example as "CalendarOwner"; see 170) indicates that the information is complete (e.g., by clicking on the "Save and Send Invitations" graphical button 110), the underlying electronic calendar application then notifies the invitees, typically by sending a meeting invitation to each of the invitees. Use of electronic calendar applications for scheduling meetings of multiple persons in this manner is known in the art.

The GUI 200 in FIG. 2 depicts a Calendar Events section 220, representing meeting acceptance notifications that have been received by a calendar owner 210 as a meeting originator, and is representative of a Lotus Notes® GUI. In this example, two sample meeting acceptance notifications are shown (see 221, 222, where the names of the meeting invitees are depicted as "Person A" and "Person B"), and in this example, the meeting invitation has been accepted by each invitee, as indicated generally at 230. For example, the meeting invitees 221, 222 may have chosen to accept a meeting notification by clicking an "Accept" button that is rendered upon opening the meeting notification (not illustrated in FIG. 2), thereby causing an entry for the meeting to be automatically placed on the invitee's electronic calendar.

However, it may happen that when a meeting originator sends a meeting invitation, other attendees of that meeting would like to change certain fields of the calendar entry that corresponds to the meeting invitation, or would like to make some addition to the information in the calendar entry. Using existing techniques, such an invitee must contact the meeting originator (for example, by sending an email note or an instant message, or by making a phone call) and ask the originator to make the change. The meeting originator then updates the original meeting invitation, and as a result, the calendar application sends out a new updated meeting invitation to all of the existing invitees. This is an inefficient, time-consuming approach which requires actions by multiple people. (And, if the meeting originator misunderstands the requested change, then these steps must be repeated to make the correct change.)

Figure 3:
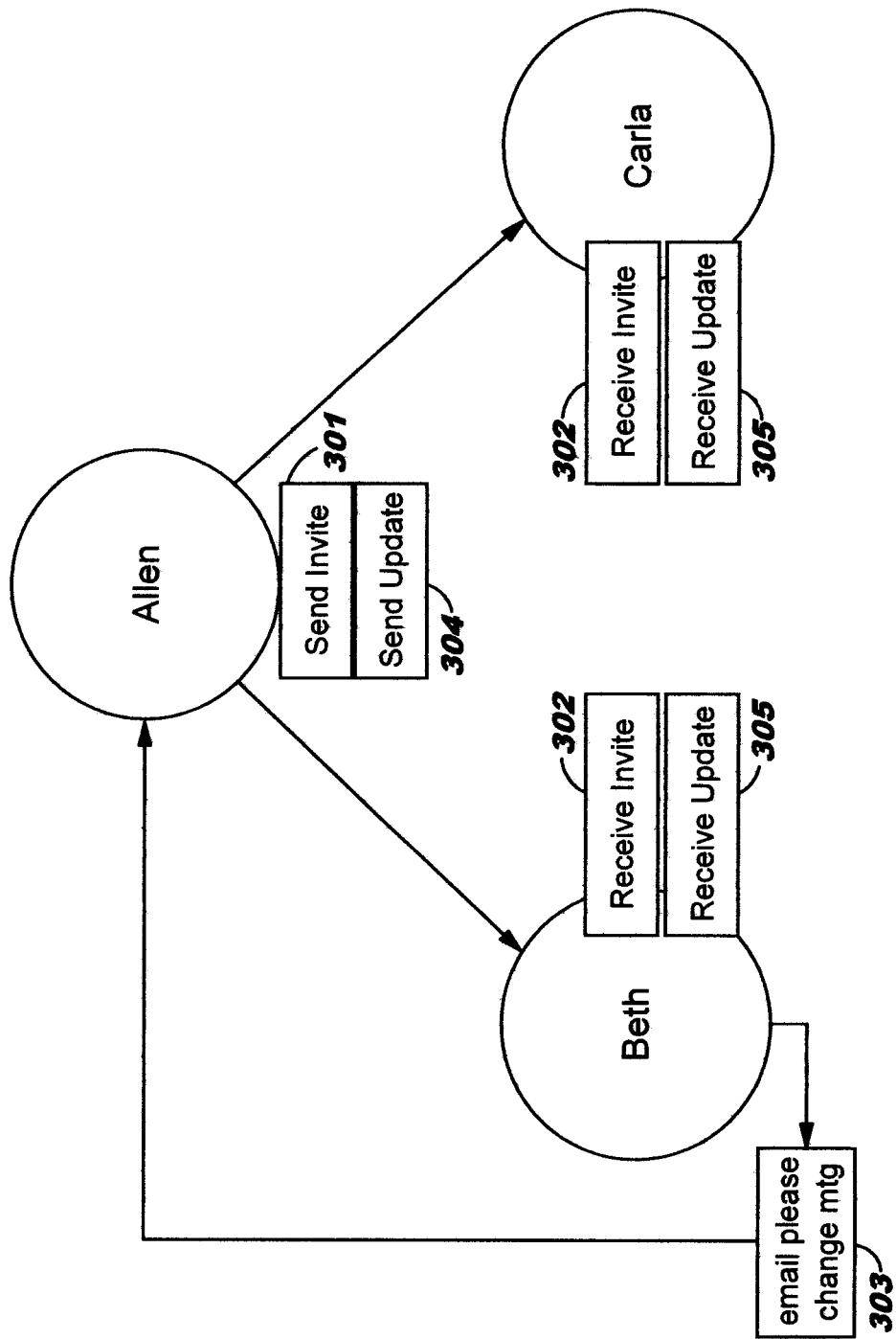
FIG. 3 provides a high-level view of the process with which a meeting originator invites other people to a meeting, and sends updated meeting invitations, according to the prior art.

In a sample scenario, suppose that a team leader "Allen" schedules a meeting on the topic of "Our upcoming monthly team meeting", and invites his team members "Beth" and "Carla". FIG. 3 provides a high-level view of this process, where the invitations are sent from the meeting originator's electronic calendar application as shown at 301 and where 302 indicates receipt of the meeting invitations by the invitees. Suppose this initial meeting invitation created by Allen contains the text "Here's a reminder of the topics we need to discuss at our upcoming team meeting. Please be prepared to discuss each of your action items.".

Further suppose that when Beth receives this meeting invitation, she sends an email note to Allen, containing a message such as "Could you please add the items you and I discussed last Friday, so everyone will have those items (and our comments) on their calendar entry?". This communication from Beth to Allen is shown at 303. Using an existing approach, Allen creates an updated meeting invitation upon receiving Beth's request, and his calendar application sends this updated invitation to the original invitee list (i.e., to Beth and Carla, in this example), as shown at 304. The invitees then receive the updated meeting invitation, as shown at 305, and must manually accept the updated invitation to cause the updated meeting information to appear on their electronic calendars.

Suppose that some time later, Carla discovers that she would like to have someone else invited to the upcoming team meeting, such as Doug, a representative from another team who can discuss a set of deliverables that Allen's team members need for their current project. Using an existing approach, Carla calls Allen on the phone and asks him to add Doug to the invitation list for this meeting. Again, Allen has to create another update to the meeting invitation, and this updated invitation is sent to the new invitation list (not shown in FIG. 3).

As can be seen from this sample scenario, a lot of extra work is required of the meeting originator to accommodate change requests from the meeting invitees. And, as the number of people on the invitation list grows, the potential for this type of extra work also grows.

In addition to this problem of extra work, another type of problem arises when using an existing approach in cases where the meeting originator is away from the office and is not able to access his calendar application while he is away. In this situation, it may become nearly impossible for the meeting invitation to be updated. If Allen has an assistant with authorization to update Allen's electronic calendar, for example, then this is one way that the updates could be made in Allen's absence. However, this type of authorization is not always granted, and thus there may be many instances where no one can access the original meeting invitation in order to make updates and send out revised invitations.

In some cases, the meeting originator is not actually a meeting attendee. This may be especially true for recurring meetings, where (for example) an administrative person handles the meeting scheduling for an executive. Often, the agenda for a particular instance of a recurring meeting is not set until a few days before the meeting date. It may happen in these and other cases that the meeting originator does not return to the office, or to another location where the calendar application is accessible, until after the scheduled meeting date has passed. The meeting originator may therefore be unable to notify the invitees of the requested updates.

If the meeting originator is not available or able to revise the meeting invitation, then a "work-around" such as sending email messages to each invitee may be necessary. However, this approach is not integrated with an electronic calendar application, and thus the updated information either doesn't get entered on the invitee calendars or must be manually transferred from the email message to the invitee calendars (and as will be obvious, both of these options are problematic).

Embodiments of the present invention enable selectively updating fields of electronic calendar entries by meeting invitees who have been invited to attend a particular meeting. (The terms "meeting invitation" and "calendar entry" may be used interchangeably herein when discussing the information to be updated using embodiments of the present invention, as the calendar entry corresponds to, and is created from, the meeting invitation.) Permission may be granted to make additions, changes, and/or deletions in selected fields of a particular calendar entry, and such permissions may be granted to one or more of the meeting invitees. (The term "update" is used in a general sense herein to refer to making additions, making changes, or making deletions to fields.)

Figure 4:
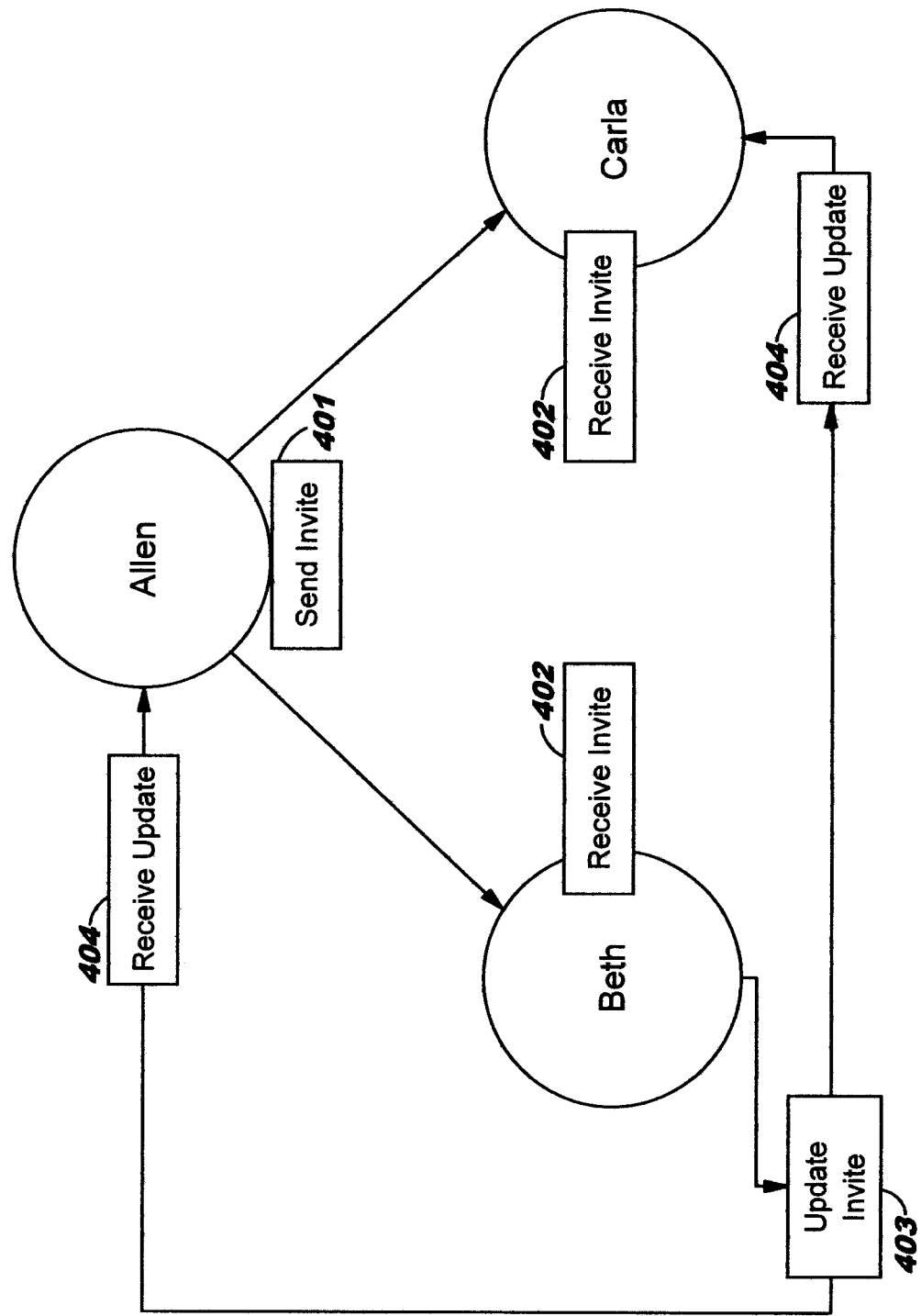
FIG. 4 shows a high-level view of a process with which a meeting invitee may take advantage of update permissions to send updated meeting invitations, according to embodiments of the present invention.

Accordingly, when a meeting originator creates a meeting invitation, he may grant permission to all meeting invitees, or to selected meeting invitees, to update specific fields of the corresponding calendar entry that will be created from this meeting invitation. In effect, the invitees who are granted update permission can update and then resend the meeting invitation. FIG. 4 shows a high-level view of the process with which a meeting invitee may take advantage of this update permission. In this sample scenario, Allen schedules a meeting and meeting invitations are sent to his team members Beth and Carla (see 401), who receive these invitations (see 402) and may then schedule the meeting onto their electronic calendar (e.g., by clicking an "Accept" or "Update Calendar" button when viewing the invitation). Using an embodiment of the present invention, Beth creates an updated invitation (see 403) comprising an update to a field or fields for which Allen has given Beth update permission, and an updated invitation is then sent to all other meeting invitees as well as to the meeting originator (see 404, where these updated invitations are received).

The permissions which are granted by the meeting originator may comprise permission to update a field or fields of a calendar entry. The fields for which update permission may be granted may include, by way of example, the meeting description, the required invitee list, the optional invitee list, and so forth. The meeting originator may specify that some fields of the calendar entry are read-only, and therefore cannot be updated by any of the meeting invitees. Examples of fields for which updates might be prohibited include the meeting subject, location, and/or time.

When an invitee is granted permission to update a particular field or fields, he can then generate an updated meeting invitation based on those particular fields (or a subset thereof). An embodiment of the present invention then automatically sends the updated meeting invitation to the meeting originator and to the other meeting invitees. Upon receiving this updated meeting invitation (e.g., as a meeting invitation sent from the calendar application), each recipient may then click an "Update Calendar" button or similar graphic, and the information stored in the meeting entry on his or her personal electronic calendar is then updated in a similar manner to processing an updated meeting invitation from the meeting originator.

FIG. 5 shows another sample GUI 500 that is used to illustrate operation of embodiments of the present invention. FIG. 5 shows fields that team leader Allen might fill in when generating a meeting invitation for his team meeting, using the scenario discussed above, including the meeting subject 510, invitation (or "To") list 520, date 530, and so forth. Using an embodiment of the present invention, Allen can grant update permissions to invitee Beth by (in one approach) selecting Beth's identifier 521 in the "To" list 520 and opening a window 550 that presents entries corresponding to the fields of the invitation. (Window 550 is also referred to herein as a "permissions" window.) Allen might, for example, place the mouse cursor over Beth's identifier, double-click the left mouse button to select this identifier, and then press the right mouse button to pop up window 550. (Other techniques for specifying permissions and associating those permissions with a meeting invitee may be used without deviating from the scope of the present invention.)

In the example permissions window shown in FIG. 5, the window 550 contains a first entry 551 that is usable by the meeting originator to grant update permission to all fields of the calendar entry (i.e., the calendar entry that will be created on electronic calendars to correspond to this meeting invitation), as well as other entries 552-557 that are usable to grant access to individual fields of the calendar entry. In the scenario illustrated in FIG. 5, Allen is giving Beth update permission to the "Subject" field and the "Description" field, as indicated graphically by shading shown at 552 and 557, respectively. (Shading is used in FIG. 5 for drafting convenience; preferably, an embodiment of the present invention uses a suitable graphical highlighting technique.) Existing techniques may be used to enable selecting more than one entry from window 550, such as pressing the "CTRL" key and then clicking on the desired entries.

If the meeting originator wishes to grant update permission to more than one meeting invitee, then the identifier corresponding to the next invitee may be selected in the "To" list and the permissions window can then be opened for indicating the corresponding permissions for this invitee. Or, an embodiment may provide a capability for granting permissions to multiple invitees in one operation, whereby the identifier corresponding to more than one invitee is selected prior to using permissions window 550 to grant permissions. Note that, in the general case, it is not necessary for each invitee to receive identical permissions, and some invitees might not be granted any update permissions.

Figure 6:
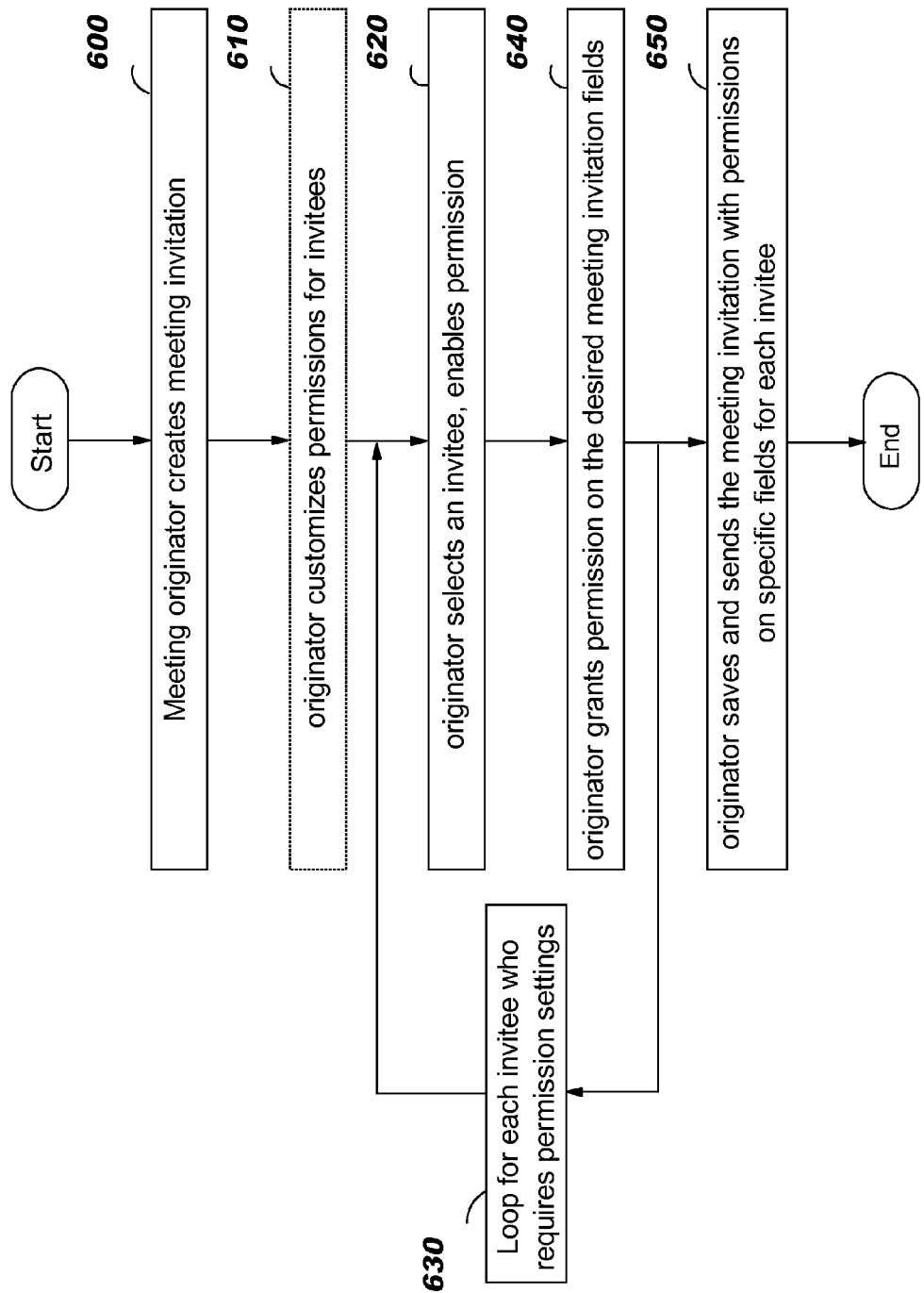
FIGS. 6 and 10 provide flowcharts depicting logic which may be used when implementing embodiments of the present invention.

Referring now to FIG. 6, this figure shows a flowchart depicting logic which may be used when implementing an embodiment of the present invention, and pertains to granting update permission. This process begins with the meeting originator scheduling the meeting (Block 600), preferably using an electronic calendar application (or alternatively, another application which embodies techniques disclosed herein). At Block 610, an optional step may be included (as denoted by the dashed rectangle) whereby the meeting originator customizes permissions for invitees. For example, he or she may configure preferences indicating that, by default, a selected field or fields should always be editable for all invitees (such as the meeting description field), or that some fields should be read-only (i.e., those fields should never be editable); and, for those fields that are editable, preferences may be configured (for example) to indicate that the default permission is to grant add permission and change permission but not delete permission.

The originator then selects an invitee and enables update permission for this invitee (Block 620). This may comprise, in one approach, setting a flag or other indicator to show that this invitee has permission to update at least one field of the corresponding meeting invitation. At Block 640, the originator grants permission to this invitee to update a particular field or fields of the meeting invitation (using, for example, a permissions window such as window 550 of FIG. 5), including specifying which type of update is permitted for that field (or, if a default update type is available, the meeting originator may choose to let the permission use the default update type).

This process of selecting invitees and granting permissions may repeat, as desired for a particular meeting invitation, as indicated in Block 630. When all desired permissions have been granted, control reaches Block 650 where the originator saves the meeting invitation and sends a copy to each invitee. In one approach, the granted permissions are associated with the meeting invitation through a mapping stored in a repository that is accessible to each invitee's electronic calendar application. In another approach, the invitation sent to each invitee includes a specification of the permissions granted to that invitee (e.g., as an array of bit settings that corresponds to the fields of the meeting invitation). The processing of FIG. 6 then exits.

While FIG. 6 illustrates setting permissions during the process of creating a meeting invitation, in another approach, the meeting originator can set update permission at a later time, for example by reopening the meeting invitation and setting permissions. In this case, if the permissions are specified in the meeting invitations, then the invitations are preferably resent to communicate the updated permissions to the invitees.

Preferably, the permissions granted for updating a particular meeting invitation expire once the date and time of that meeting has passed. For a recurring meeting (such as a weekly or monthly status meeting), the meeting originator is preferably allowed to grant update permissions that apply to each recurring instance or to only a selected meeting instance. See FIG. 1, where a check-box 131 is used in this sample GUI to indicate that a meeting is a recurring (i.e., repeating) meeting. In one approach, a similar check-box (not shown in FIG. 5)

may be displayed on GUI 500 in association with permissions window 550, allowing the meeting originator to indicate whether the selected permissions apply to each instance of the recurring meeting or only to a single instance of the recurring meeting.

FIG. 7 illustrates a GUI 700 depicting a sample meeting invitation 720 as received and accepted by a meeting invitee. Suppose this is the meeting invitation sent by Allen to Beth with permissions granted, as discussed above with reference to GUI 500 of FIG. 5. Accordingly, when Beth opens the meeting invitation, an "Edit Document" button 710 is preferably included on GUI 700 along with the displayed meeting invitation 720. If this invitee has been granted at least one update permission for this invitation, then the button 710 may be activated by the invitee; otherwise, button 710 may be omitted or grayed out. Preferably, the invitee also sees a graphical indication of the updateable field or fields in this invitation. In FIG. 7, an asterisk has been placed beside the name of each changeable field to convey this information (as shown at 721 and 722), and a message 725 is displayed to explain the significance of the asterisk to the invitee who views this invitation. (Other techniques for conveying granted permissions to the invitee may be used without deviating from the scope of the present invention.) So, GUI 700 indicates to Beth that she has update permission for the "Subject" field and the "Description" field (as discussed above with reference to entries 552 and 557 of permissions window 550).

If Beth chooses to use her update permissions, she preferably presses the "Edit Document" button 710. A GUI such as sample GUI 800 of FIG. 8 may be presented in response. Preferably, Beth then adds to the information in a particular field if she has add permission, or overtypes the information if she has change permission, or erases the information if she has delete permission. In FIG. 8, shading is used over particular field values to visually "block out" those fields for which this invitee does not have any update permissions, such as the "To:" field 820, thereby indicating that no updates can be made to those fields. Other techniques for conveying this information may be used, alternatively.

In GUI 800, for example, Beth has chosen to update the Description field 821. Suppose the original meeting invitation shown at 720 of FIG. 7 stated the meeting description as "Meeting to discuss X" (see 723), and that Beth then changes this meeting description to "Meeting to discuss X and discuss Y", as shown at 822. When she presses the "Save and Send Invitations" button 810, each of the other meeting invitees (including the meeting originator) will now receive an updated meeting invitation that includes this revised meeting description.

Optionally, the particular type of update permission granted to the meeting invitee may be indicated visually on the GUI, although this has not been illustrated in FIG. 8. For example, different icons may be depicted or different highlighting may be used. Fields highlighted in blue, for example, may indicate that the meeting invitee has permission to add to this field, and fields highlighted in yellow may indicate that the meeting invitee has permission to change this field, and so forth.

In an optional enhancement, a meeting invitee may request update permission to update a field or fields for which update permission has not yet been granted by the meeting originator. In this case, a request is preferably sent from the meeting invitee's electronic calendar application to the meeting originator to request update permission for a particular meeting invitation. Preferably, this request identifies the particular fields and the particular meeting invitation for which the invitee is requesting update permission. If the meeting originator wishes to grant at least some of the requested permissions, an embodiment of this optional enhancement preferably opens the meeting invitation and allows the meeting originator to grant permissions in a manner analogous to that which was discussed above with reference to FIGS. 5 and 6. In response, an updated meeting invitation is preferably sent to each of the meeting invitees; alternatively, the updated invitation might be sent only to the invitee who requested granting of permissions.

FIG. 9 shows a sample GUI 900 to illustrate how the updated meeting invitation created by Beth in FIG. 8 may appear to the recipients of this updated invitation. Description field 930 now includes the updated meeting description 931 created by Beth, using her update permission for this field. (Note also that the "To:" list at 921 now reflects Allen, the meeting originator, and Carla, the other meeting invitee.) If this updated invitation is acceptable to the recipient, he or she then presses the "Update Calendar" button 910 and the updated information is then placed on that recipient's electronic calendar. Optionally, an indication as to which meeting invitee made the updates corresponding to a particular updated invitation may be displayed, although this is not shown in FIG. 9; this may be useful (as one example) for meetings having a large number of invitees or (as another example) for recurring meetings in which the meeting invitees send updated invitations to specify topics for the agenda of a particular meeting instance.

Figure 10:
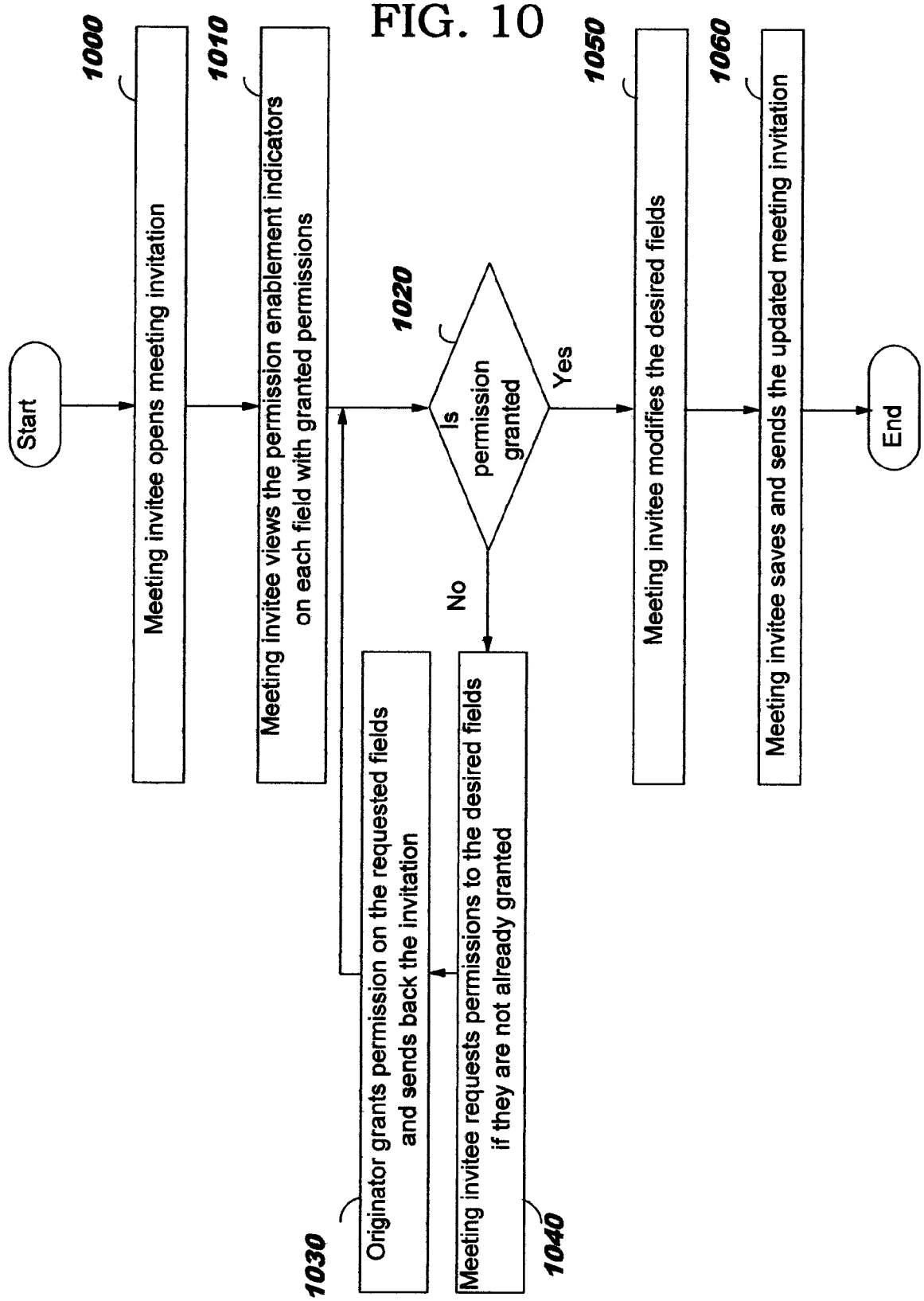

FIG. 10 provides a flowchart depicting logic which may be used when implementing an embodiment of the present invention, and pertains to using update permissions. This process begins at Block 1000, where a meeting invitee opens a meeting invitation. The meeting invitee views the permissions granted for each field of the invitation for which this invitee has update permission (Block 1010). As discussed above with reference to FIG. 7, this may comprise (by way of illustration but not of limitation) seeing that selected fields have an asterisk associated therewith, or that selected fields are visually highlighted in different ways.

Block 1020 then asks whether this invitee has been granted update permission for a particular field or fields for which the invitee would like to make an update. If so, then processing continues at Block 1050. Otherwise, processing may continue at Block 1040 when the optional enhancement discussed above is implemented. That is, the meeting invitee may request update permission for one or more fields (Block 1040) and, if the meeting originator grants at least a subset of the requested permissions, then an updated meeting invitation is sent out (Block 1030).

Upon reaching Block 1050, the meeting invitee has permission to update the desired field or fields, and makes the appropriate updates. The invitee then saves this updated meeting invitation and sends a copy to each of the other meeting invitees (including the meeting originator), as shown at Block 1060. The processing of FIG. 10 then exits.

Prior art electronic calendar applications allow calendar owners to grant authority to others to read or update entries on their calendar. This may be useful, for example, for executives whose calendar is managed by an administrative assistant. For example, a manager "Mary" may grant authority to her secretary "Jim" to update entries on Mary's electronic calendar. However, this provides only an "all or nothing" approach, whereby the person to whom authority is granted will have access to all calendar entries of the other person's calendar, and to all fields of those calendar entries. It is unlikely that this type of global update permission is desired by most calendar owners for all of the meeting invitations they create. Furthermore, this prior art approach does not let a meeting invitee update a meeting invitation unless that invitee accesses the meeting originator's electronic calendar and makes the updates there, acting as if he or she was the meeting originator. In some cases, corporate policy might be violated through use of global update permission or by enabling others to access a particular meeting originator's calendar, as these acts could open confidential or otherwise sensitive information to unauthorized viewers. By contrast, as has been discussed above, embodiments of the present invitation grant selected meeting invitees update permission with regard to a particular field or fields of a particular meeting invitation, and such permissions are preferably temporary—that is, they expire once the meeting date and time have passed.

While embodiments of the present invention have been described herein as being provided through an electronic calendar application, this is by way of illustration and not of limitation. In one other approach, a separate application may be created for scheduling meetings that enables meeting originators to grant permissions, and/or a separate application may be created that enables meeting invitees to update meeting invitations and send out updated meeting invitations. Furthermore, while embodiments of the present invention may operate at least partially on a client machine (e.g., on an end-user device executing an electronic calendar application), embodiments of the present invention may also, or alternatively, operate at least partially on a server machine (e.g., on a back-end device that manages electronic calendar information for a plurality of calendar users).

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 11:
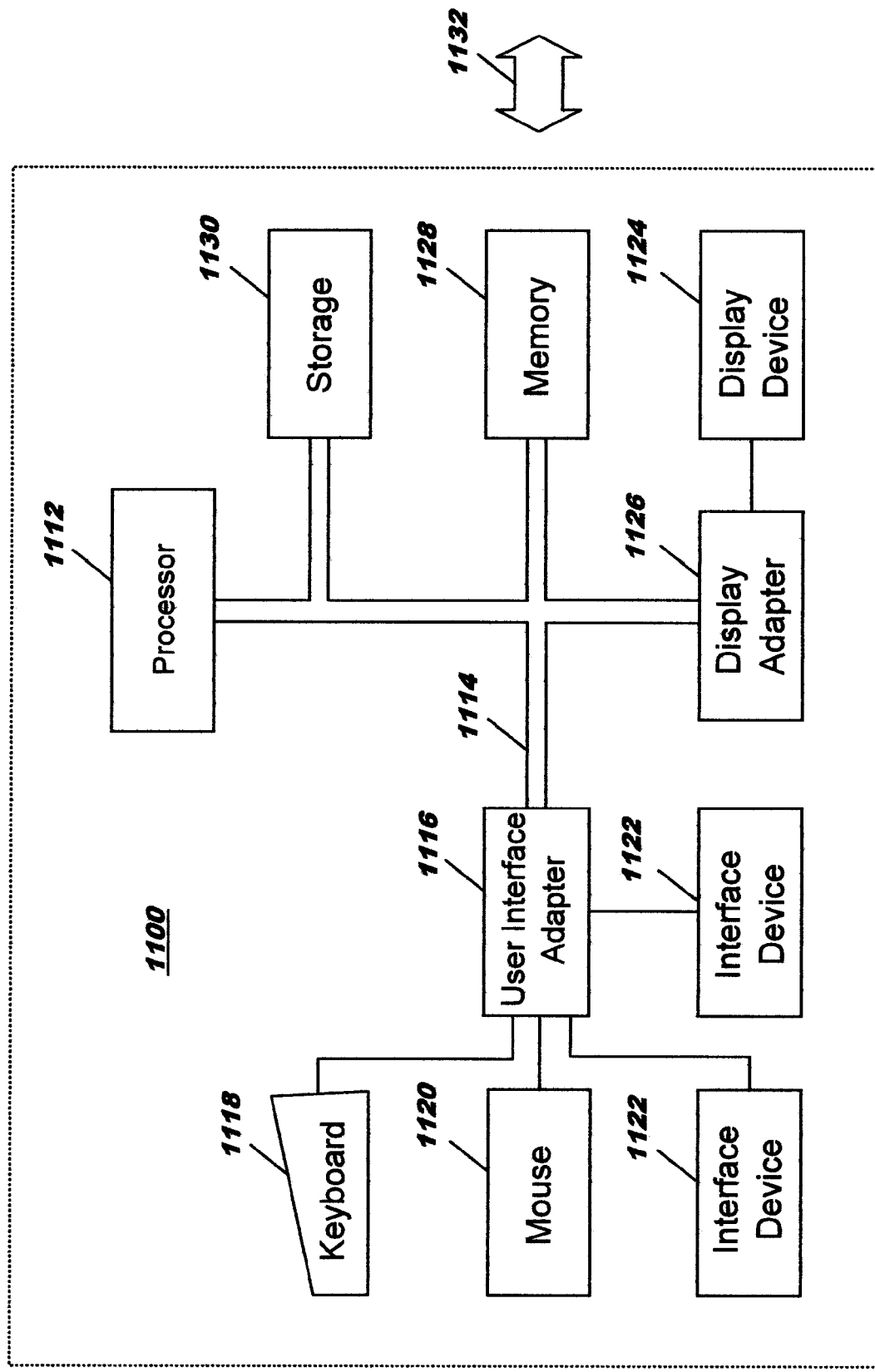
FIG. 11 depicts a data processing system suitable for storing and/or executing program code.

Referring now to FIG. 11, a data processing system 1100 suitable for storing and/or executing program code includes at least one processor 1112 coupled directly or indirectly to memory elements through a system bus 1114. The memory elements can include local memory 1128 employed during actual execution of the program code, bulk storage 1130, and cache memories (not shown) which provide temporary storage of at least some program code in order to reduce the number of times code must be retrieved from bulk storage during execution.

Input/output ("I/O") devices (including but not limited to keyboards 1118, displays 1124, pointing devices 1120, other interface devices 1122, etc.) can be coupled to the system either directly or through intervening I/O controllers or adapters (1116, 1126).

Network adapters may also be coupled to the system to enable the data processing system to become coupled to other data processing systems or remote printers or storage devices through intervening private or public networks (as shown generally at 1132). Modems, cable modem attachments, wireless adapters, and Ethernet cards are just a few of the currently-available types of network adapters.

Figure 12:
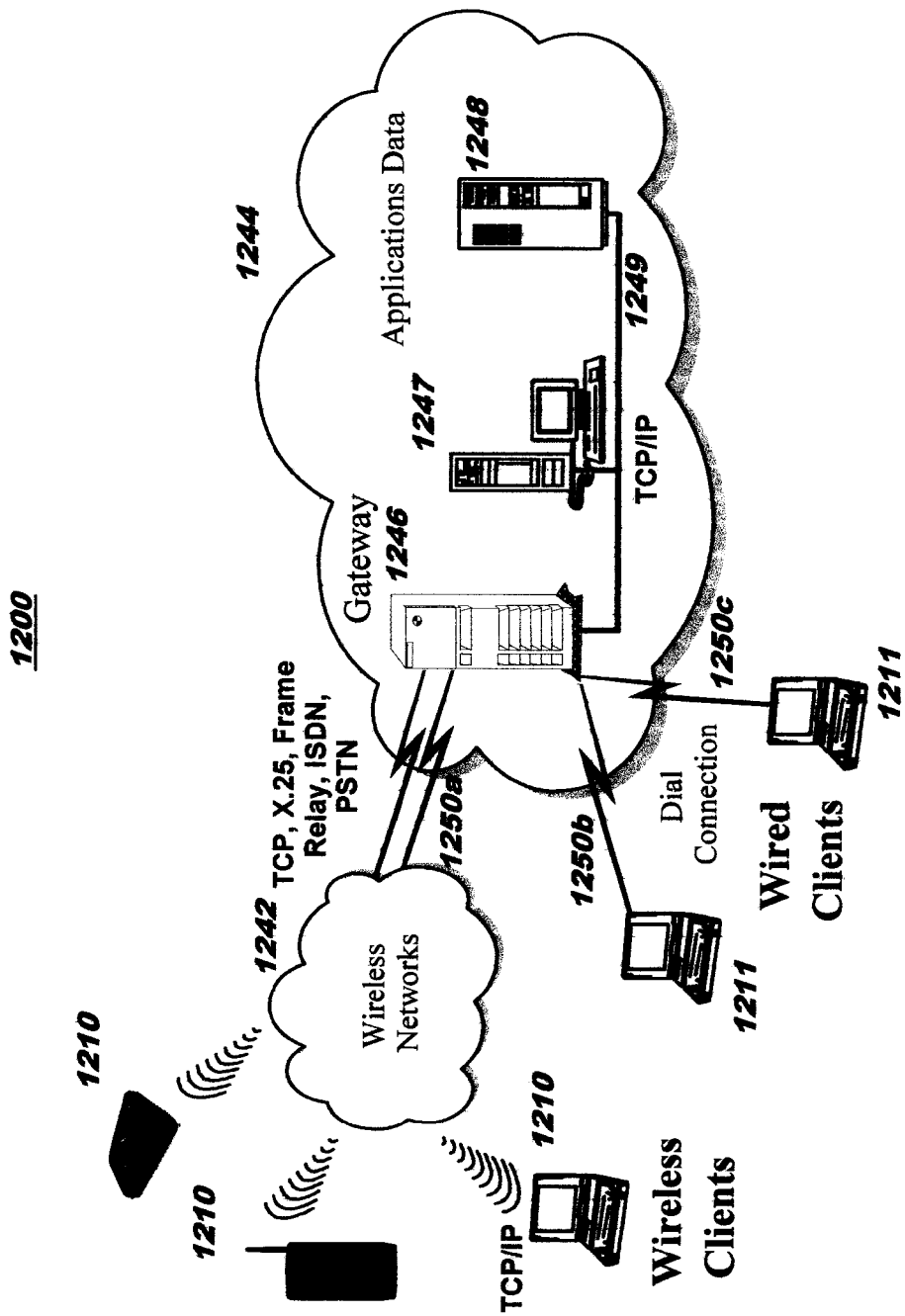
FIG. 12 depicts a representative networking environment in which one or more embodiments of the present invention may be used.

FIG. 12 illustrates a data processing network environment 1200 in which the present invention may be practiced. The data processing network 1200 may include a plurality of individual networks, such as wireless network 1242 and network 1244. A plurality of wireless devices 1210 may communicate over wireless network 1242, and a plurality of wired devices, shown in the figure (by way of illustration) as workstations 1211, may communicate over network 1244. Additionally, as those skilled in the art will appreciate, one or more local area networks ("LANs") may be included (not shown), where a LAN may comprise a plurality of devices coupled to a host processor.

Still referring to FIG. 12, the networks 1242 and 1244 may also include mainframe computers or servers, such as a gateway computer 1246 or application server 1247 (which may access a data repository 1248). A gateway computer 1246 serves as a point of entry into each network, such as network 1244. The gateway 1246 may be preferably coupled to another network 1242 by means of a communications link 1250a. The gateway 1246 may also be directly coupled to one or more workstations 1211 using a communications link 1250b, 1250c, and/or may be indirectly coupled to such devices. The gateway computer 1246 may be implemented utilizing an Enterprise Systems Architecture/390® computer available from IBM. Depending on the application, a midrange computer, such as an Application System/400® (also known as an AS/400®) may be employed. ("Enterprise Systems Architecture/390", "Application System/400", and "AS/400" are registered trademarks of IBM in the United States, other countries, or both.)

The gateway computer 1246 may also be coupled, for example using a 1249, to a storage device (such as data repository 1248).

Those skilled in the art will appreciate that the gateway computer 1246 may be located a great geographic distance from the network 1242, and similarly, the wireless devices 1210 and/or workstations 1211 may be located some distance from the networks 1242 and 1244, respectively. For example, the network 1242 may be located in California, while the gateway 1246 may be located in Texas, and one or more of the workstations 1211 may be located in Florida. The wireless devices 1210 may connect to the wireless network 1242 using a networking protocol such as the Transmission Control Protocol/Internet Protocol ("TCP/IP") over a number of alternative connection media, such as cellular phone, radio frequency networks, satellite networks, etc. The wireless network 1242 preferably connects to the gateway 1246 using a network connection 1250a such as TCP or User Datagram Protocol ("UDP") over IP, X.25, Frame Relay, Integrated Services Digital Network ("ISDN"), Public Switched Telephone Network ("PSTN"), etc. The workstations 1211 may connect directly to the gateway 1246 using dial connections 1250b or 1250c. Further, the wireless network 1242 and network 1244 may connect to one or more other networks (not shown), in an analogous manner to that depicted in FIG. 12.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of updating an electronic calendar, comprising:
generating a meeting invitation, responsive to a meeting originator scheduling a meeting having a plurality of meeting invitees, wherein the meeting invitation comprises a plurality of fields, the meeting invitation configured to cause an electronic calendar application to create a corresponding calendar entry, having corresponding fields, on the electronic calendar upon acceptance of the meeting invitation;
generating, for each of the plurality of meeting invitees, a field-specific update permission specification corresponding to the meeting invitation, responsive to the meeting originator granting field-specific update permission to at least one of the meeting invitees who is distinct from the meeting originator, wherein:
the field-specific update permission specification specifies, for each of the plurality of fields, whether this meeting invitee is allowed to update the field in the calendar entry;
the granted field-specific update permission comprises permission to add to, change, or delete the field in the calendar entry; and
the field-specific update permission granted to at least two of the meeting invitees is different; and
sending, to each of the plurality of meeting invitees, the generated meeting invitation and a representation of the field-specific update permission specification generated for that meeting invitee, the field-specific update permission specification enabling the meeting invitee to update any of the fields in the calendar entry for which the meeting originator granted field-specific update permission to the meeting invitee.

2. The method according to claim 1, further comprising:
using, by a selected one of the meeting invitees that is granted field-specific update permission, the granted field-specific update permission to update at least one field for which field-specific update permission is granted, the update configured to generate an updated meeting invitation for the meeting and the updated meeting invitation configured to cause the electronic calendar application to update the created corresponding calendar entry upon acceptance of the updated meeting invitation.

3. The method according to claim 2, further comprising:
sending the updated meeting invitation to the meeting originator and each of the meeting attendees other than the selected one.

4. The method according to claim 1, wherein each generated field-specific update permission specification expires once a scheduled date and time of the meeting has passed.

5. The method according to claim 1, wherein each generated field-specific update permission specification is stored in a repository which is accessible to the electronic calendar application.

6. The method according to claim 1, wherein each generated field-specific update permission specification specifies a type of update that is permitted for each field in the calendar entry corresponding to the meeting invitation for which the meeting originator granted field-specific update permission.

7. The method according to claim 1, wherein the generated field-specific update permission specifications are linked to the sent meeting invitations.

8. The method according to claim 1, wherein the meeting is an instance of a recurring meeting, the generated meeting invitation applies to this instance of the recurring meeting, and each generated field-specific update permission specification applies only to this instance of the recurring meeting.

9. The method according to claim 1, wherein the meeting is an instance of a recurring meeting, the generated meeting invitation applies to more than one instance of the recurring meeting, and each generated field-specific update permission specification applies to each of the more than one instances of the recurring meeting.

10. The method according to claim 1, wherein the meeting is an instance of a recurring meeting, the generated meeting invitation applies to all instances of the recurring meeting, and each generated field-specific update permission specification applies to all of the instances of the recurring meeting.

11. The method according to claim 1, wherein a default permission for at least one field of the meeting invitation is configured for use by the meeting originator and at least one of the generated field-specific update permission specifications uses the default permission for that field.

12. The method according to claim 1, further comprising:
updating at least one field for which field-specific update permission is granted to a selected one of the meeting invitees, responsive to the selected meeting invitee using the granted field-specific update permission, the update configured to generate an updated meeting invitation for the meeting and the updated meeting invitation configured to cause the electronic calendar application to update the at least one updated field in the corresponding calendar entry upon acceptance of the updated meeting invitation.

13. A computer-implemented system for updating an electronic calendar, comprising:
   a computer comprising a processor; and
   instructions executable using the processor to implement functions comprising:
      generating a meeting invitation for inviting a plurality of meeting invitees to attend a meeting scheduled by a meeting originator, the meeting invitation comprising a plurality of fields, the meeting invitation configured to cause an electronic calendar application to create a corresponding calendar entry, having corresponding fields, on the electronic calendar upon acceptance of the meeting invitation;
      generating, for each of the plurality of meeting invitees, a field-specific update permission specification corresponding to the meeting invitation, responsive to the meeting originator granting field-specific update permission to at least one of the meeting invitees who is distinct from the meeting originator, wherein:
         the field-specific update permission specification specifies, for each of the plurality of fields, whether this meeting invitee is allowed to update the field in the calendar entry;
         the granted field-specific update permission comprises permission to add to, change, or delete the field in the calendar entry; and
         the field-specific update permission granted to at least two of the meeting invitees is different; and
      sending, to each of the plurality of meeting invitees, the generated meeting invitation and a representation of the field-specific update permission specification generated for that meeting invitee, the field-specific update permission specification enabling the meeting invitee to update any of the fields in the calendar entry for which the meeting originator granted field-specific update permission to the meeting invitee.

14. The system according to claim 13, wherein the functions further comprise:
   enabling a particular one of the meeting invitees that receives the sent meeting invitation, and that is granted field-specific update permission to update at least one field, to update at least one of the at least one field, the update configured to generate an updated meeting invitation for the meeting and the updated meeting invitation configured to cause the electronic calendar application to update the created corresponding calendar entry upon acceptance of the updated meeting invitation.

15. The system according to claim 13, wherein the functions further comprise sending, to the meeting originator and each of the meeting attendees other than the selected one, the updated meeting invitation.

16. A computer program product for updating an electronic calendar, the computer program product embodied on one or more non-transitory computer-usable storage media and comprising computer-readable program code which, when executed by a computer, performs:
   generating a meeting invitation, responsive to a meeting originator scheduling a meeting having a plurality of meeting invitees, wherein the meeting invitation comprises a plurality of fields, the meeting invitation configured to cause an electronic calendar application to create a corresponding calendar entry, having corresponding fields, on the electronic calendar upon acceptance of the meeting invitation;
   generating, for each of the plurality of meeting invitees, a field-specific update permission specification corresponding to the meeting invitation, responsive to the meeting originator granting field-specific update permission to at least one of the meeting invitees who is distinct from the meeting originator, wherein:
      the field-specific update permission specification specifies, for each of the plurality of fields, whether this meeting invitee is allowed to update the field in the calendar entry;
      the granted field-specific update permission comprises permission to add to, change, or delete the field in the calendar entry; and
      the field-specific update permission granted to at least two of the meeting invitees is different; and
   sending, to each of the plurality of meeting invitees, the generated meeting invitation and a representation of the field-specific update permission specification generated for that meeting invitee, the field-specific update permission specification enabling the meeting invitee to update any of the fields in the calendar entry for which the meeting originator granted field-specific update permission to the meeting invitee, the update configured to generate an updated meeting invitation for the meeting and the updated meeting invitation configured to cause the electronic calendar application to update the created corresponding calendar entry upon acceptance of the updated meeting invitation.

17. The computer program product according to claim 16, wherein each meeting invitee is prevented from updating any of the fields in the calendar entry corresponding to the meeting invitation for which that meeting invitee is not granted field-specific update permission.

18. The computer program product according to claim 16, wherein each generated field-specific update permission specification is stored in a repository which is accessible to the electronic calendar application and expires once a scheduled date and time of the meeting has passed.

19. A computer-implemented method of scheduling meetings on an electronic calendar, comprising:
   receiving, by a selected one of a plurality of meeting invitees, a meeting invitation, responsive to a meeting originator scheduling a meeting having the plurality of meeting invitees, wherein:
      the meeting invitation comprises a plurality of fields;
      the meeting invitation is configured to cause an electronic calendar application of the particular one to schedule a corresponding calendar entry, having corresponding fields, for the meeting on the electronic calendar upon acceptance of the meeting invitation;
      a field-specific update permission specification is associated with the meeting invitation and specifies, for each of the plurality of fields, whether the meeting originator granted field-specific update permission to the selected meeting invitee to update the field in the calendar entry, the selected meeting invitee being distinct from the meeting originator;
      the granted field-specific update permission comprises permission to add to, change, or delete the field in the calendar entry; and
      the field-specific update permission granted to at least two of the plurality of meeting invitees is different; and using, by the selected meeting invitee, the granted field-specific update permission to update at least one field in the calendar entry for which field-specific update permission is granted, the update configured to generate an updated meeting invitation for the meeting and the updated meeting invitation configured to cause the electronic calendar application to update the scheduled corresponding calendar entry upon acceptance of the updated meeting invitation.

\* \* \* \* \*